United States Patent

Peirce

[11] Patent Number: 5,547,407
[45] Date of Patent: Aug. 20, 1996

[54] BOAT MOTOR TRIM AND TILT ASSEMBLY

[75] Inventor: James G. Peirce, Madison Lake, Minn.

[73] Assignee: Johnson Worldwide Assocites, Inc., Sturtevant, Wis.

[21] Appl. No.: 376,187

[22] Filed: Jan. 20, 1995

[51] Int. Cl.⁶ .................................................. B63H 5/12
[52] U.S. Cl. .................................................. 440/61
[58] Field of Search ........................... 440/53, 61, 63, 440/900; 248/640–643

[56] References Cited

U.S. PATENT DOCUMENTS

| | | | |
|---|---|---|---|
| 3,581,702 | 6/1971 | Moberg | 115/41 |
| 3,990,660 | 11/1976 | Pipoz | 248/4 |
| 4,354,848 | 10/1982 | Hall et al. | 440/61 |
| 4,362,513 | 12/1982 | Hall et al. | 440/63 |
| 4,367,860 | 1/1983 | Strang | 248/641 |
| 4,501,562 | 2/1985 | Blanchard | 440/61 |
| 4,573,931 | 3/1986 | Anderson et al. | 440/61 |
| 4,673,358 | 6/1987 | Iwai et al. | 440/61 |
| 4,889,507 | 12/1989 | Tahara et al. | 248/641 |
| 5,049,099 | 9/1991 | Ito et al. | 440/61 |
| 5,151,058 | 9/1992 | Tahara et al. | 248/642 |
| 5,169,350 | 12/1992 | Tsujii | 440/61 |
| 5,195,914 | 5/1993 | Binversie et al. | 440/56 |

Primary Examiner—Edwin L. Swinehart
Attorney, Agent, or Firm—Foley & Lardner

[57] ABSTRACT

A first member is pivotally connected to a second member. A rigid support and a linking member are pivotally connected to one another and interconnected between the first member and the second member. The length of the rigid support is selectively adjustable at a constant rate. Adjustment of the length of the rigid support within a first range of length causes the second member to pivot at a first angular velocity relative to the first member. Adjustment of the length of the rigid support within a second range of length causes the second member to pivot at a second, relatively greater angular velocity relative to the first member.

16 Claims, 2 Drawing Sheets

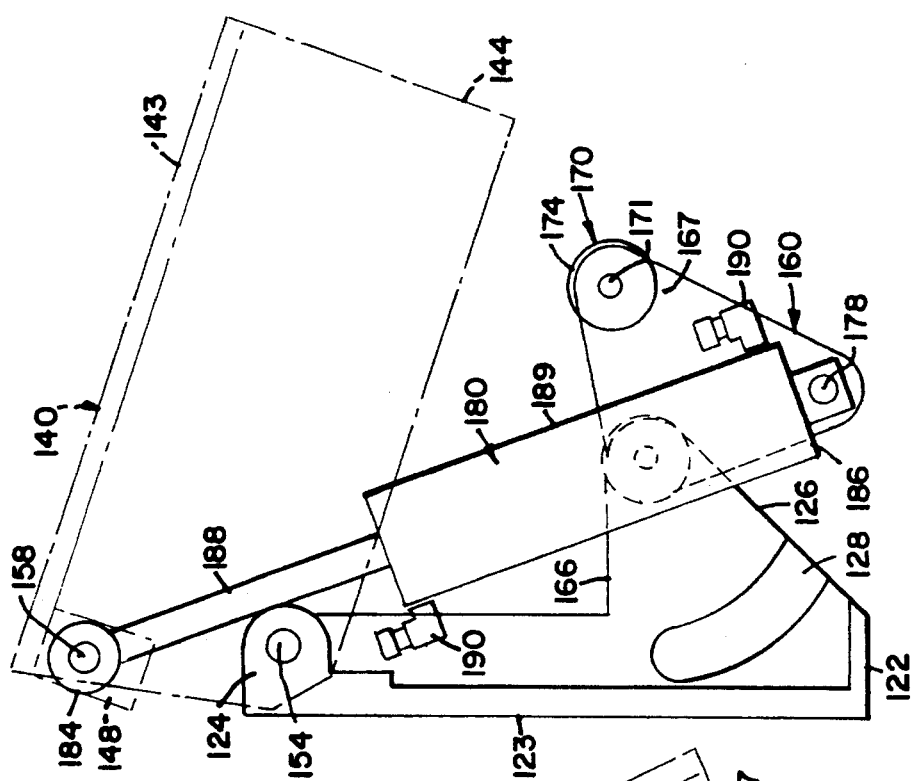
FIG.1c
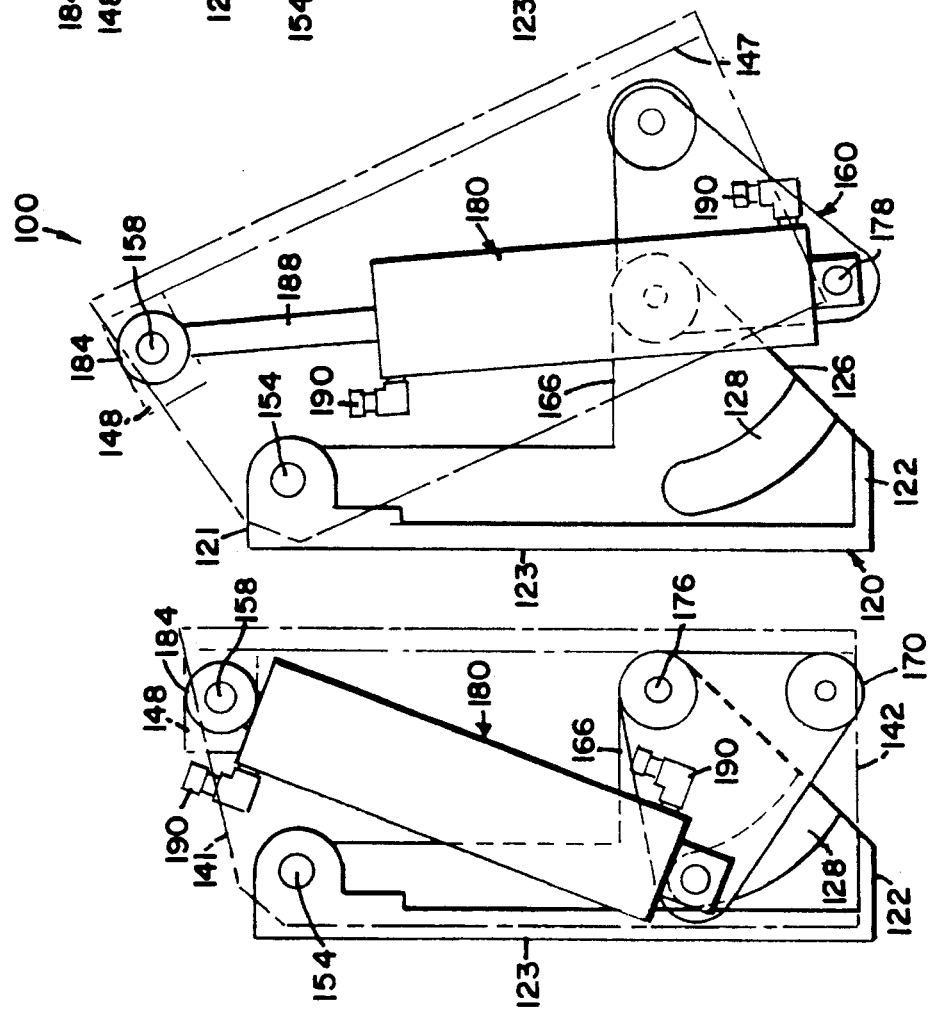
FIG.1b
FIG.1a

BOAT MOTOR TRIM AND TILT ASSEMBLY

FIELD OF THE INVENTION

The present invention relates to methods and apparatus for pivotally mounting a first object relative to a second object, and in a particular application, to trimming and tilting a motor pivotally mounted on a boat.

BACKGROUND OF THE INVENTION

In general, an outboard propulsion unit is secured to watercraft in a manner that allows the unit to pivot relative to the watercraft. Typically, the unit is pivotable through a range of working positions, in which the propeller remains in the water, and through a range of inoperable positions, in which the propeller is raised out of the water.

The first or lower range of pivoting, in which the propeller merely undergoes an adjustment in its angle in the water, may be referred to as the "trim" portion of the available pivotal movement. Typically, the propulsion unit is trimmed to adjust the orientation of the propeller relative to the body of water in which it is operating and/or relative to the transom of the watercraft. In this manner, maximum thrust can be maintained under various operating conditions.

The second or upper range of pivoting, in which the propeller is clear of the water, may be referred to as the "tilt" portion of the upward pivotal movement. The propulsion unit is tilted to avoid damage in very shallow water and during transportation of the boat to and from the water.

The operating parameters associated with moving an outboard propulsion unit through the trim portion of its pivotal movement are distinctly different from the operating parameters associated with moving the unit through the tilt portion of its pivotal movement. For example, trimming may be performed against the thrust of the propulsion unit and may also require finer incremental adjustments in angle than does tilting.

Mechanisms have been proposed and/or are presently available for pivotally mounting outboard propulsion units to watercraft. However, none of these prior art mechanisms satisfactorily addresses the need for the two distinct stages of pivotal movement in a manner that is entirely satisfactory. For example, prior art mechanisms utilize a relatively complicated combination of parts, or a separate operator, such as a hydraulic cylinder, associated with each type of pivotal movement, or a cylinder and pump combination capable of operating at a different speed for each type of pivotal movement. As a result, such mechanisms are relatively expensive and more difficult to operate and maintain. Also, such mechanisms are likely to be relatively heavy and thus, less convenient to handle and transport. As a result of these shortcomings (and others) of prior art mechanisms, a need remains for a device that effectively and efficiently mounts a first object relative to second object and selectively pivots one relative to the other.

SUMMARY OF THE INVENTION

The present invention provides apparatus and methods for pivotally connecting a second object relative to a first object and selectively pivoting the second object relative to the first object. In addition to a direct pivotal connection therebetween, the objects are further interconnected by means of a linkage that includes a rigid support having an effective length that may be selectively adjusted at a constant rate. As the length of the rigid support is varied within a first range of available lengths, the second object pivots at a first constant angular velocity relative to the first object. As the length of the rigid support is varied within a second range of available lengths, the second object pivots at a second constant angular velocity relative to the first object.

In a preferred embodiment, the linkage further includes another rigid member pivotally interconnected between the first object and the rigid support. In turn, the rigid support is pivotally interconnected between the rigid member and the second object. Also, the rigid support is a single stage, constant volume, hydraulic piston assembly in fluid communication with a constant volume pump. The pump and piston assembly operate to adjust the length of the rigid support at only the single, constant rate and thus, are of relatively simple and inexpensive construction. Yet, the present invention nonetheless facilitates trimming and tilting of a propulsion unit relative to a watercraft at a level of sophistication comparable to that of more complicated and costly prior art devices. In particular, where the first object is a watercraft, and the second object is a motor, the motor is trimmed at a first angular velocity relative to the watercraft and tilted at a second angular velocity relative to the watercraft. These and other benefits of the present invention will become apparent from the more detailed description of the preferred embodiment that follows.

BRIEF DESCRIPTION OF THE DRAWING

With reference to the Figures, wherein like numerals represent like parts and assemblies throughout the several views, and relative sizes of parts and assemblies are shown substantially to scale:

FIG. 1a is a partially sectioned side view of a preferred embodiment mounting assembly constructed according to the principles of the present invention, depicted in a first configuration;

FIG. 1b is a partially sectioned side view of the mounting assembly shown in FIG. 1a, depicted in a second configuration;

FIG. 1c is a partially sectioned side view of the mounting assembly shown in FIG. 1a, depicted in a third configuration;

FIG. 3 is a partially sectioned front view of the mounting assembly shown in FIG. 1a.

DETAILED DESCRIPTION OF A PREFERRED EMBODIMENT

Figure 2:
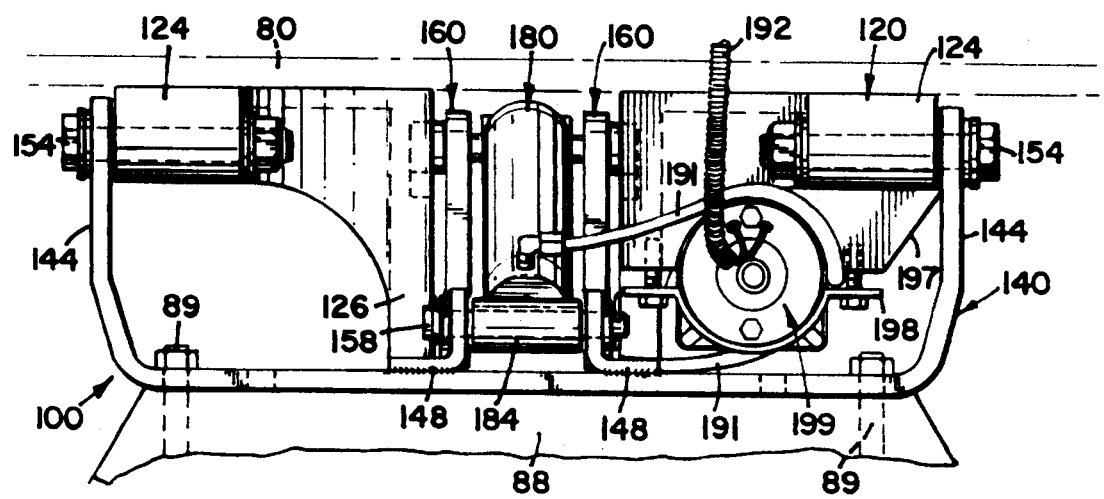
FIG. 2 is a top view of the mounting assembly shown in FIG. 1a, depicted interconnecting a propulsion unit to a watercraft.
Figure 3:
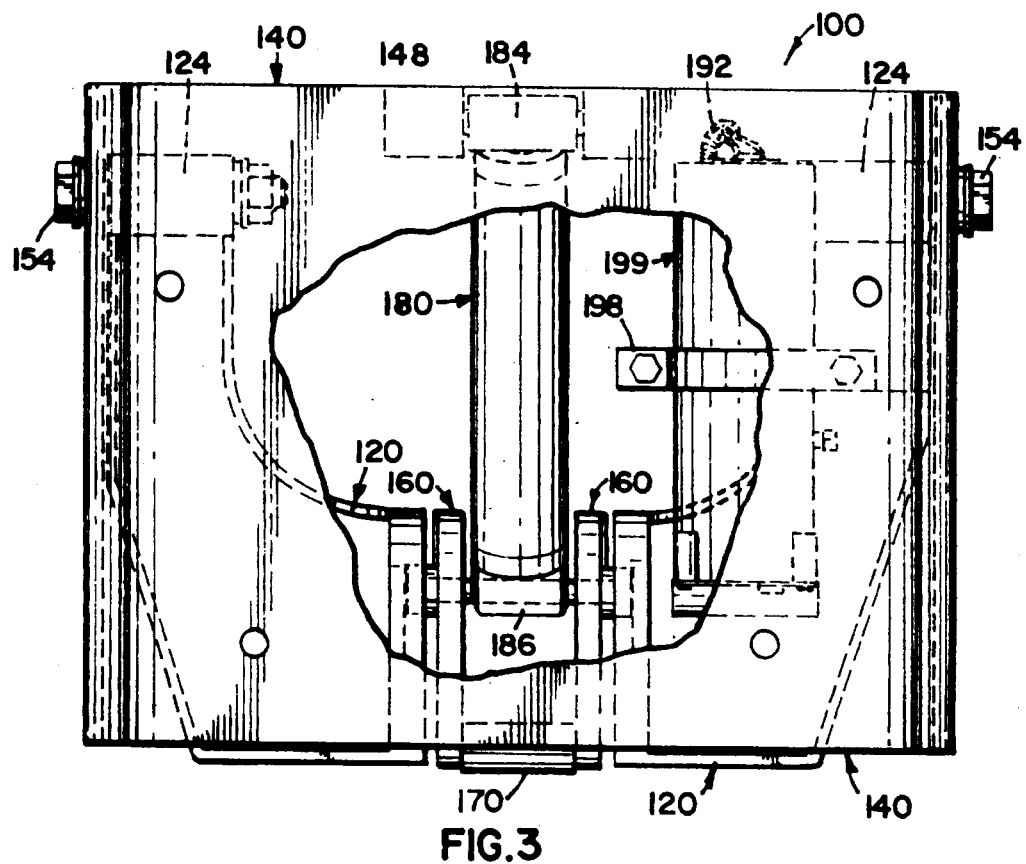

A preferred embodiment of the present invention is designated as 100 in FIGS. 1–3. The preferred embodiment 100 is designed for and described with reference to a specific application in which a propulsion unit or motor 88 is pivotally mounted relative to a watercraft or boat 80. In this application, the present invention may be referred to as a boat motor lift assembly or trim and tilt assembly. The assembly 100 generally includes a first rigid member 120, a second rigid member 140, a pair of linking or third rigid members 160, and a piston assembly 180.

The first rigid member 120 may be described as having an upper end 121, a lower end 122, and a base plate 123 extending therebetween. The base plate 123 is secured relative to the rear of the boat 80 by bolts or other means known in the art (not shown). A first trunnion 124 on each side of the first rigid member 120 extends perpendicularly away from the boat 80 proximate the upper end 121 of the base plate 123. A second trunnion 126 on each side of the first rigid member 120 extends perpendicular away from the boat 80 proximate the lower end 122 of the base plate 123. The second trunnions 126 extend farther from the base plate 123 than the first trunnions 124. The second trunnions 126 also cooperate with the base plate 123 to define a substantially L-shaped profile, with the base plate 123 constituting a relatively longer segment, and the second trunnions 126 constituting the relatively shorter segment.

The second rigid member 140 may also be described with reference to an upper end 141 and a lower end 142. The second mounting rigid member 140 includes a base plate 143 that extends from the upper end 141 to the lower end 142 and is secured relative to a motor 88 by bolts 89 or other means known in the art. A sidewall 144 extends substantially perpendicularly from each side of the base plate 143 and away from the motor 88. The sidewalls 144 and the base plate 143 cooperate to define a substantially U-shaped cross section. The sidewalls 144 cooperate with the base plates 123 and 143 to effectively house the other components of the assembly 100 when the base plates 123 and 143 are substantially parallel to one another.

Each sidewall 144 is secured to a respective upper trunnion 124 on the first rigid member 120 by means of a bolt 154 extending through holes in the respective trunnion 124 and sidewall 144. The hole through each sidewall 144 is proximate an upper distal corner thereof, and the hole through each upper trunnion 124 is proximate an upper, distal end of the base plate 123. The bolts 154 define an axis about which the second rigid member 140 pivots relative to the first rigid member 120. Each of the upper distal corners has been clipped to avoid interference with the boat 80 as the second rigid member 140 pivots about the pivot axis so defined.

A pair of brackets 148 extend substantially perpendicularly from the base plate 143, proximate the upper end 141 thereof and intermediate the sidewalls 144. The brackets 148 are spaced a sufficient distance apart to receive a first or rod end 184 of the piston assembly 180. The rod end 184 is pivotally secured to the second rigid member 140 by means of a pin 158 extending through holes in the rod end 184 and each of the flanges 148. The holes through the flanges 148 are proximate the base plate 143 and the upper end 141 thereof. The distance between the pivot axes defined by the pin 158 and the bolts 154 is approximately four (4) inches.

The piston assembly 180 extends from the rod end 184 to a second or cylinder end 186. The rod end 184 is disposed at one end of a rod 188 that is movably secured within a cylinder 189 by means known in the art. The cylinder end 186 is disposed at an end of the cylinder 189 opposite the rod 188. The cylinder end 186 is pivotally secured between opposing portions 168 of the third rigid members 160 by means of a pin 178 extending through holes in the cylinder end and each of the opposing portions 168. An arcuate groove 128 may be formed in each of the lower trunnions 126 to ensure sufficient clearance for the pin 178 as the third rigid members 160 pivot relative to the first rigid member 120.

The piston assembly 180 is placed in fluid communication with a pump 199 by means of valves 190 and hoses 191. The pump 199 is secured to a wall 197 on the first rigid member 120 by means of a bracket 198 and a pair of bolts. Cables 192 connect the pump 199 to a power source and a remote operator. The pump 199 may be referred to as a constant volume pump, and the piston assembly 180 may be referred to as a single speed, constant volume, hydraulic cylinder. The pump 199 and the piston assembly 180 cooperate to extend and contract the rod 188 at a single, constant rate relative to the cylinder 189. Those skilled in the art will recognize that other mechanisms, such as linear actuator, could be used to similarly function as a single rate, linear force applying means interconnected between the third rigid members 160 and the second rigid member 140.

Each of the third rigid members 160 may described as a substantially flat member in the shape of an acute triangle having rounded vertexes or corner portions. A hole is formed through each of the third rigid members 160 proximate each of the corner portions. The piston assembly 180 is disposed between the third rigid members 160, which in turn, are disposed between the lower trunnions 126 on the first rigid member 120. One of the three opposing pairs of corner portions corresponds to the opposing portions 168 to which the cylinder end 186 of the piston assembly 180 is pivotally secured.

Another of the three corner portions 166 on each of the third rigid members 160 is pivotally secured to a respective lower trunnion 126 on the first rigid member 120. In particular, a hole is formed through each trunnion 126 proximate a distal end thereof, and each corner portion 166 is pivotally secured to a respective trunnion 126 by means of a bolt 176 extending through the aligned holes. The bolts 176 define an axis about which the third rigid member 160 pivots relative to the first rigid member 120. The distance between the pivot axes defined by the bolts 176 and the bolts 154 is at least eight (8) inches.

The remaining corner portion 167 on each of the third rigid members 160 supports a roller 170 extending between the two rigid members 160. A shaft 171 extending beyond each end of the roller 170 extends into the hole in each of the remaining corner portions 167. The diameter of the roller 170 is such that the roller 170 extends beyond the edges of the rounded corner portions 167, and an outermost cylindrical surface 174 on the roller 170 engages or bears against a substantially planar surface 147 on the base plate 143 of the second rigid member 140 as the second rigid member 140 approaches a parallel orientation relative to the first rigid member 120. The third rigid members 160 and associated parts of the assembly 100 cooperate to maintain the third rigid members 160 in parallel relationship to one another.

The operation of the assembly 100 and the relative movement of its parts may be described with reference to movement of the rod 188 relative to the cylinder 189 and corresponding pivoting of the second member 140 relative to the first member 120. As the piston assembly 180 varies in length from a substantially contracted configuration to a substantially extended configuration, the second member 140 pivots away from the first member 120. The manner in which the piston assembly 180 and the linking members 160 are interconnected between the first member 120 and the second member 140 is such that the angular velocity of pivoting changes even though the speed at which the piston assembly changes length remains constant. As a result, a relatively simple and inexpensive, single speed and constant volume piston assembly and pump are sufficient to provide a relatively sophisticated, two speed pivoting assembly.

The second member 140 pivots at a first, relatively slower angular velocity (relative to the first member 120) when the piston assembly 180 is within a first range of relative shorter lengths. The extremes of this first range are shown in FIGS.

1a and 1b. Some of the distinguishing characteristics within this first range of piston assembly lengths are that (1) the piston assembly 180 extends between the pivot axis defined by the bolts 154 and the pivot axis defined by the bolts 176; (2) the roller 170 bears against the inwardly directed, substantially planar surface 147 on the base plate 143 of the second member 140; (3) the linking members 160 rotate substantially relative to the first member 120; (4) the piston assembly 180 rotates substantially relative to the linking members 160; (5) the piston assembly 180 rotates to a greater degree relative to the first member 120 and to a lesser degree relative to the second member 140 than within the second range of piston assembly lengths; and (6) the second member 140 rotates to a lesser degree relative to the first member 120 than within the second range of piston assembly lengths.

The second member 140 pivots at a second, relatively faster angular velocity (relative to the first member 120) when the piston assembly 180 is within a second range of relative longer lengths. The extremes of this second range are shown in FIGS. 1b and 1c. Some of the distinguishing characteristics within this second range of piston assembly lengths are that (1) the piston assembly 180 is aligned with the pivot axis defined by the bolts 176; (2) the surface 147 separates from or disengages the roller 170; (3) the linking members 160 remain substantially fixed relative to the first member 120; (4) the piston assembly 180 remains substantially fixed relative to the linking members 160; (5) the piston assembly 180 rotates to a lesser degree relative to the first member 120 and to a greater degree relative to the second member 140 than within the first range of piston assembly lengths; and (6) the second member 140 rotates to a greater degree relative to the first member 120 than within the first range of piston assembly lengths.

When the length of the piston assembly 180 is at the lower extreme of the first range, as shown in FIG. 1a, the rod 188 is disposed substantially within the cylinder 189. The base plate 143 on the second rigid member 140 is substantially parallel to the base plate 123 on the first rigid member 120, and is also substantially parallel to a line drawn through the bolts 176 and the pin 171. The motor 88 may be said to be at a minimum available trim angle relative to the boat 80. From this relatively contracted configuration, extension of the rod 188 from the cylinder 189 increases the effective length of the piston assembly 180, thereby causing (1) the linking members 160 to pivot about the bolts 176 relative to the trunnions 126; (2) the roller 170 to bear upon the inwardly facing, substantially planar surface 147 on the base plate 143 (at a relatively greater moment arm than that defined between the upper end 184 of the piston assembly 180 and the upper trunnions 124); and (3) the motor 88 to pivot about the bolts 154 relative to the boat 80.

The roller 170 continues to bear upon the surface 147 and the linking members 160 continue to rotate substantially until the length of the piston assembly reaches the upper extreme of the first range, which coincides with the lower extreme of the second range. At this point of relative stability for the piston assembly 180, which is shown in FIG. 1b, and from this point on to greater piston assembly lengths, the pivot axis defined by the bolts 176 is aligned with the rod end 184 and the cylinder end 186 of the piston 180, and the lower or cylinder end 186 remains relatively fixed. Further extension of the rod 188 from the cylinder 189 pivots the motor 88 more rapidly because the lower end 186 of the piston 180 is essentially fixed. Thus, any further extension of the piston assembly 180 is almost entirely in the upward direction, resulting in faster pivoting of the second member 140 relative to the first member 120, even though the piston assembly 180 continues to extend at the same constant rate.

Those skilled in the art will recognize that the third rigid members or linking members 160 and the piston assembly 180 cooperate to maintain the second rigid member 140 at a desired orientation relative to the first rigid member 120. This relative orientation is selectively variable through the two ranges of piston assembly length and thus, two speeds of pivoting. The first range or speed is available during trimming of the motor 88 and not only allows for greater sensitivity in obtaining a desired angle but also provides more power for acting against the thrust of the motor. The second range or speed is available during tilting of the motor 89 and provides greater speed for getting the motor clear of the water and potential hazards.

The present invention also provides methods of mounting and selectively pivoting a second object relative to a first object. Such methods should be apparent to those skilled in the art from the foregoing description of the preferred embodiment and its operation. Thus, only a brief discussion of a preferred method of mounting and selectively pivoting a motor relative to a boat is provided below. In general, the preferred method includes the steps of (1) fixing a first member to the boat; (2) fixing a second member to the motor; (3) pivotally connecting the second member to the first member; (4) pivotally connecting a first end of a piston assembly to the second member; (5) pivotally connecting a third member to the first member at a first pivot location; (6) pivotally connecting the third member to a second, opposite end of the piston assembly at a second pivot location; (7) placing the piston assembly in fluid communication with a pump; and (8) operating the pump to vary piston assembly length at a single, fixed rate through a first range of piston assembly length, wherein the second pivot location rotates about the first pivot location and constrains the motor to pivot at a first angular velocity relative to the boat, and through a second range of piston assembly length, wherein the second pivot location remains essentially fixed relative to the first pivot location and constrains the motor to pivot at a second, different angular velocity relative to the boat.

Although the present invention has been described with reference to a preferred embodiment, a preferred method, and a particular application, those skilled in the art will recognize additional embodiments, methods, and/or applications that nonetheless fall within the scope of the present invention. For example, the present invention may be used on a dump truck having a bin that pivots relative to the frame of the truck. Accordingly, the present invention is limited only to the extent of the claims that follow:

I claim:

1. An apparatus for pivoting a propulsion unit relative to a watercraft, comprising:

a first rigid member to be connected to the watercraft;

a second rigid member to be connected to the propulsion unit, wherein said second rigid member is pivotally connected to said first rigid member at a first pivot point;

a third rigid member disposed between said first rigid member and said second rigid member, and pivotally connected to said first rigid member at a second pivot point;

a linear force applying means that cooperates with said third rigid member to maintain said second rigid member at a desired orientation relative to said first rigid member, said linear force applying means having a first end pivotally connected to said second rigid member, and a second end pivotally connected to said third rigid member, wherein when said linear force applying means is in a first, relatively contracted configuration, said second rigid member occupies a first orientation relative to said first rigid member, and when said linear force applying means extends toward a second, relatively extended configuration, said third rigid member pivots about said second pivot point as said second rigid member pivots about said first pivot point to a second orientation relative to said first rigid member, and when said linear force applying means extends toward a third, relatively more extended configuration, said third rigid member remains in an effectively fixed orientation as said second rigid member pivots about said first pivot point to a third orientation relative to said first rigid member.

2. An apparatus according to claim 1, further comprising a roller on said third rigid member, radially displaced from said second pivot point, wherein said roller bears against a surface on said second rigid member between said first orientation and said second orientation.

3. An apparatus according to claim 2, wherein said surface is substantially planar.

4. An apparatus according to claim 1, wherein an angle of approximately twenty-five degrees is defined between said first orientation and said second orientation.

5. An apparatus according to claim 4, wherein an angle of approximately forty-five degrees is defined between said second orientation and said third orientation.

6. An apparatus according to claim 1, wherein said first rigid member is substantially L-shaped, and includes a first, relatively longer segment that is connected to the watercraft, and a second, relatively shorter segment that extends away from the first object and toward said second rigid member, and said first pivot point is proximate a distal end of said first segment, and said second pivot point is proximate a distal end of said second segment.

7. An apparatus according to claim 1, wherein said linear force applying means is a piston assembly in fluid communication with a pump and operable to extend and contract at a single speed.

8. An apparatus according to claim 1, wherein said second rigid member has a substantially U-shaped cross-section defined in part by a pair of opposing sidewalls sized and arranged to effectively house said linear force applying means and said third rigid member when said linear force applying means is in said first, relatively contracted configuration.

9. A method of mounting and selectively pivoting a motor relative to a boat, comprising the steps of:

fixing a first member to the boat;

fixing a second member to the motor;

pivotally connecting the second member to the first member;

pivotally connecting a first end of a piston assembly to the second member;

pivotally connecting a third member to the first member at a first pivot location;

pivotally connecting the third member to a second, opposite end of the piston assembly at a second pivot location;

placing the piston assembly in fluid communication with a pump; and operating the pump to vary piston assembly length at a single, fixed rate through a first range of piston assembly length, wherein the second pivot location rotates about the first pivot location and constrains the motor to pivot at a first angular velocity relative to the boat, and through a second range of piston assembly length, wherein the second pivot location remains essentially fixed relative to the first pivot location and constrains the motor to pivot at a second, different angular velocity relative to the boat.

10. A pivot assembly for moving an outboard motor between lowered and raised positions, comprising:

a first member;

a second member pivotally connected to the first member;

a linking member pivotally coupled to the first member about a first pivot axis; and a connecting means interconnected between the second member about a second pivot axis and the linking member about a third pivot axis, the connecting means including a rigid support having a length that is selectively adjustable, wherein adjustment of the length of the rigid support within a first range of length causes the second member to pivot at a first angular velocity relative to the first member, and adjustment of the length of the rigid support within a second range of length causes the second member to pivot at a second, relatively greater velocity relative to the first member, a transition between the first and second ranges corresponding to alignment of the first, second and third pivot axes.

11. A pivot assembly according to claim 10, wherein the rigid support includes a rod and a cylinder that are interconnected and movable relative to one another at the constant rate by means of a pump in fluid communication therewith.

12. A pivot assembly according to claim 10, wherein the linking member rotates substantially during adjustment of the length of the rigid support within the first range of length, and the linking member remains substantially still during adjustment of the length of the rigid support within the second range of length.

13. A pivot assembly according to claim 10, wherein the rigid support rotates relative to the first member relatively more during adjustment of the length within the first range of length than during adjustment of the length within the second range of length, and the second member rotates relative to the first member relatively less during adjustment of the length within the first range of length than during adjustment of the length within the second range of length.

14. A pivot assembly according to claim 10, wherein the rigid support is aligned with the second pivot axis only when the length of the rigid support is within the second range of length.

15. A pivot assembly according to claim 10, wherein the linking member supports a roller that engages the second member when the length of the rigid support is within the first range of length.

16. A pivot assembly according to claim 10, wherein the rigid support rotates substantially relative to the linking member only during adjustment of the length of the rigid support within the first range of length.

* * * * *